United States Patent
Pati et al.

(10) Patent No.: US 10,448,106 B2
(45) Date of Patent: Oct. 15, 2019

(54) PROFILE BASED CHANNEL NAVIGATION

(71) Applicant: ARRIS Enterprises LLC, Suwanee, GA (US)

(72) Inventors: Satya Prakash Pati, Bangalore (IN); Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/164,998

(22) Filed: May 26, 2016

(65) Prior Publication Data

US 2016/0360270 A1 Dec. 8, 2016

Related U.S. Application Data

(60) Provisional application No. 62/171,365, filed on Jun. 5, 2015.

(51) Int. Cl.
| | |
|---|---|
| H04N 21/466 | (2011.01) |
| H04N 21/442 | (2011.01) |
| H04N 21/45 | (2011.01) |
| H04N 21/482 | (2011.01) |
| H04N 21/488 | (2011.01) |

(52) U.S. Cl.
CPC ... *H04N 21/4667* (2013.01); *H04N 21/44204* (2013.01); *H04N 21/44222* (2013.01); *H04N 21/4532* (2013.01); *H04N 21/4826* (2013.01); *H04N 21/4882* (2013.01)

(58) Field of Classification Search
None
See application file for complete search history.

(56) References Cited

U.S. PATENT DOCUMENTS

| | | | | |
|---|---|---|---|---|
| 5,444,499 | A | * | 8/1995 | Saitoh ............... H04N 5/44543 348/734 |
| 5,734,444 | A | * | 3/1998 | Yoshinobu ............. H04N 5/44 348/734 |
| 5,801,747 | A | * | 9/1998 | Bedard .................. H04H 60/33 348/E17.001 |
| 8,843,965 | B1 | * | 9/2014 | Kurapati ............ H04N 5/44543 725/37 |
| 9,800,929 | B2 | * | 10/2017 | Pontual ............ H04N 21/44222 |
| 2004/0019908 | A1 | * | 1/2004 | Williams ............. H04N 7/0887 725/46 |

(Continued)

*Primary Examiner* — Jason K Lin
(74) *Attorney, Agent, or Firm* — Bart A. Perkins

(57) ABSTRACT

Methods, systems, and computer readable media can be operable to facilitate the generation and utilization of a profile based channel lineup. A multimedia device delivering video services to one or more users may monitor channel and content requests received by the individual one or more users, and the multimedia device may create a profile for each of the users, wherein the profile includes a channel list of only those channels that are frequently tuned to by the respective user. The multimedia device may create an association between a user, a frequently viewed channel, and a time at which the channel is typically viewed by the user. A profile based viewing session or feature may be enabled at the multimedia device, wherein tuning decisions, channel change responses, and program information displays are controlled by the multimedia device based on a profile associated with a selected user.

11 Claims, 8 Drawing Sheets

(56) References Cited

U.S. PATENT DOCUMENTS

| | | | |
|---|---|---|---|
| 2005/0149972 A1* | 7/2005 | Knudson | G06F 3/0482 |
| | | | 725/56 |
| 2007/0169148 A1* | 7/2007 | Oddo | H04N 5/44543 |
| | | | 725/46 |
| 2008/0320520 A1* | 12/2008 | Beadle | H04H 60/40 |
| | | | 725/46 |
| 2009/0138805 A1* | 5/2009 | Hildreth | G06K 9/00335 |
| | | | 715/745 |
| 2010/0077438 A1 | 3/2010 | Ansari | |
| 2014/0082664 A1 | 3/2014 | Shkedi et al. | |
| 2014/0089980 A1* | 3/2014 | Alexander | H04N 5/44543 |
| | | | 725/42 |
| 2016/0316269 A1* | 10/2016 | Parker | H04N 21/4667 |
| 2016/0360270 A1* | 12/2016 | Pati | H04N 21/4667 |

* cited by examiner

PROFILE BASED CHANNEL NAVIGATION

CROSS REFERENCE TO RELATED APPLICATION

This application is a non-provisional application claiming the benefit of U.S. Provisional Application Ser. No. 62/171,365, entitled "Profile Based Viewing on Customer Premise Equipment Device," which was filed on Jun. 5, 2015, and is incorporated herein by reference in its entirety.

TECHNICAL FIELD

This disclosure relates to navigating a plurality of channels based on a viewer profile.

BACKGROUND

Currently, users may be able to view available channels based on a favorites list which has to be manually created. The user has to create a favorites list and then go to the favorites list to watch the user's favorite channels. This process can be tedious as it hinders channel switching while a group of viewers are viewing content. For example, when a first individual and second individual are viewing a first channel that is a channel located in the first individual's "favorites" category, the categorical listing of available channels would have to be switched over to the second individual's "favorites" category to access a second channel that is in the second individual's "favorites" category.

A favorite channel list will generally vary from person to person in a family, and, if the whole family watches together, the favorite channel list varies. Also a consolidated program information display (e.g., guide channel list display) is not ordered as per favorite lists, and often presents difficulty while switching between favorite lists. It is also difficult to manually create favorite lists by remembering the channel numbers of a different "favorites" list and switching between them. Often, the user simply fails to ever create a favorites list, hence it becomes an un-utilized feature in many cases.

Typically, with access to a large number of channels, a user generally only surfs between a certain or fixed subset of the available channels on a daily basis. On a family level, the viewed channels are also different for different members. However, the guide display of a channel list (guide ordering) remains the same for everyone. Therefore, it is desirable to improve upon methods and systems for displaying available content and to provide a solution for displaying profile based viewing requiring a minimal amount of user-intervention.

BRIEF DESCRIPTION OF THE DRAWINGS

Like reference numbers and designations in the various drawings indicate like elements.

DETAILED DESCRIPTION

Figure 1:
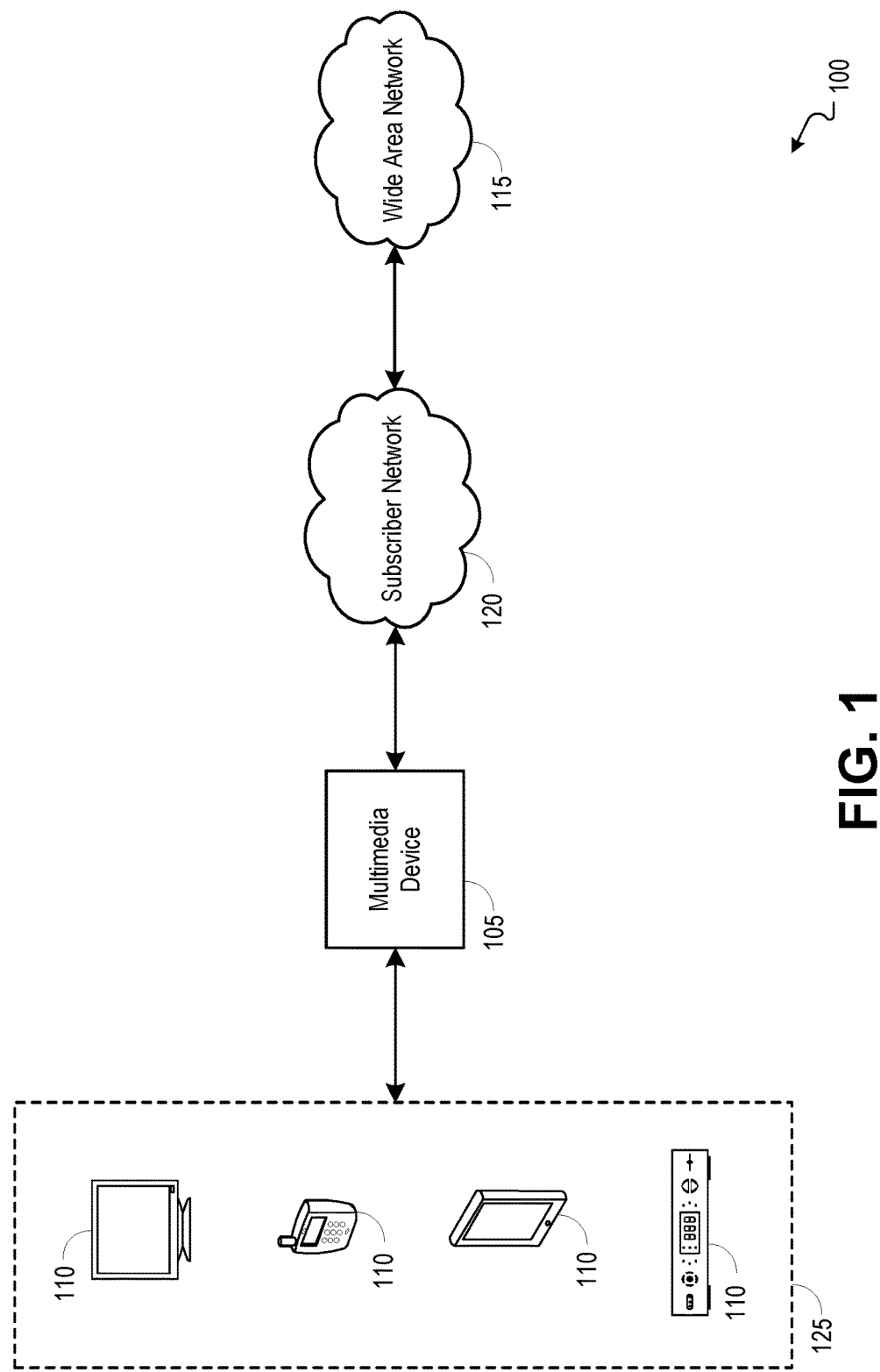
FIG. 1 is a block diagram illustrating an example network environment operable to facilitate the generation and utilization of a profile based channel lineup.

It is desirable to improve upon methods and systems for displaying available content and to provide a solution for displaying profile based viewing requiring a minimal amount of user-intervention. Methods, systems, and computer readable media can be operable to facilitate the generation and utilization of a profile based channel lineup. A multimedia device delivering video services to one or more users may monitor channel and content requests received by the individual one or more users, and the multimedia device may create a profile for each of the users, wherein the profile includes a channel list of only those channels that are frequently tuned to by the respective user. The multimedia device may create an association between a user, a frequently viewed channel, and a time at which the channel is typically viewed by the user. A profile based viewing session or feature may be enabled at the multimedia device, wherein tuning decisions, channel change responses, and program information displays are controlled by the multimedia device based on a profile associated with a selected user.

An embodiment of the invention described herein may include a method comprising: (a) initiating a user profile generation at a multimedia device, wherein the multimedia device monitors channel viewing by a user associated with the user profile for a predetermined duration of time; (b) before an expiration of the predetermined duration of time: (i) identifying each of one or more channels viewed by the user through the multimedia device; and (ii) adding each of the one or more identified channels to a profile channel list associated with the user profile; and (c) when the predetermined duration of time expires, saving the profile channel list as a list of channels made available during a profile based viewing session initiated by the user.

According to an embodiment of the invention, the method described herein further comprises: (a) receiving a channel change command; (b) identifying a next channel adjacent to a current channel within the profile channel list; and (c) outputting content associated with the next channel from the multimedia device to a display device.

According to an embodiment of the invention, the method described herein further comprises: (a) receiving a program information request; (b) identifying each of the one or more channels within the profile channel list; (c) consolidating program information associated with each of the one or more identified channels into a program information user interface; and (d) outputting the program information user interface from the multimedia device to a display device.

According to an embodiment of the invention, the method described herein further comprises: (a) identifying a time at which the user views each of the one or more identified channels; (b) generating a channel-time association for each identified time at which a channel was viewed by the user, wherein the channel-time association comprises a count equivalent to the number of times that the corresponding channel was viewed by the user at the corresponding time; and (c) saving the one or more channel-time associations within the profile channel list.

According to an embodiment of the invention, the method described herein further comprises: (a) determining that a current time is equivalent to a time of a channel-time association saved within the profile channel list; (b) identifying the channel of the channel-time association; and (c) outputting content associated with the identified channel from the multimedia device to a display device.

According to an embodiment of the invention, the method described herein further comprises: (a) determining that a current time is equivalent to a time of a channel-time association saved within the profile channel list; (b) identifying the channel of the channel-time association; and (c) outputting a prompt from the multimedia device to a display device, wherein the prompt requests an input of a user decision whether to output content associated with the identified channel from the multimedia device to the display device.

According to an embodiment of the invention, the method described herein further comprises: (a) receiving a power-on command at the multimedia device; (b) identifying a channel associated with the current time based upon the one or more channel-time associations; and (c) outputting content associated with the identified channel from the multimedia device to a display device.

An embodiment of the invention described herein may include an apparatus comprising: (a) a user profile module configured to: (i) monitor channel viewing by a user associated with a user profile for a predetermined duration of time; (ii) before an expiration of the predetermined duration of time: (1) identify each of one or more channels viewed by the user; and (2) add each of the one or more identified channels to a profile channel list associated with the user profile; and (ii) when the predetermined duration of time expires, save the profile channel list as a list of channels made available during a profile based viewing session initiated by the user.

According to an embodiment of the invention, the apparatus described herein further comprises: (a) one or more interfaces configured to be used to receive a channel change command; (b) wherein the user profile module is further configured to identify a next channel adjacent to a current channel within the profile channel list; and (c) wherein the one or more interfaces are further configured to be used to output content associated with the next channel to a display device.

According to an embodiment of the invention, the apparatus described herein further comprises: (a) one or more interfaces configured to be used to receive a program information request; (b) wherein the user profile module is further configured to: (i) identify each of the one or more channels within the profile channel list; and (ii) consolidate program information associated with each of the one or more identified channels into a program information user interface; and (c) wherein the one or more interfaces are further configured to be used to output the program information user interface to a display device.

According to an embodiment of the invention, the user profile module described herein is further configured to: (a) identify a time at which the user views each of the one or more identified channels; (b) generate a channel-time association for each identified time at which a channel was viewed by the user, wherein the channel-time association comprises a count equivalent to the number of times that the corresponding channel was viewed by the user at the corresponding time; and (c) save the one or more channel-time associations within the profile channel list.

According to an embodiment of the invention, the apparatus described herein further comprises: (a) wherein the user profile module is further configured to: (i) determine that a current time is equivalent to a time of a channel-time association saved within the profile channel list; and (ii) identify the channel of the channel-time association; and (b) one or more interfaces configured to be used to output content associated with the identified channel to a display device.

According to an embodiment of the invention, the apparatus described herein further comprises: (a) wherein the user profile module is further configured to: (i) determine that a current time is equivalent to a time of a channel-time association saved within the profile channel list; (ii) identify the channel of the channel-time association; and (b) one or more interfaces configured to be used to output a prompt to a display device, wherein the prompt requests an input of a user decision whether to output content associated with the identified channel to the display device.

An embodiment of the invention described herein may include one or more non-transitory computer readable media having instructions operable to cause one or more processors to perform the operations comprising: (a) initiating a user profile generation at a multimedia device, wherein the multimedia device monitors channel viewing by a user associated with the user profile for a predetermined duration of time; (b) before an expiration of the predetermined duration of time: (i) identifying each of one or more channels viewed by the user through the multimedia device; and (ii) adding each of the one or more identified channels to a profile channel list associated with the user profile; and (c) when the predetermined duration of time expires, saving the profile channel list as a list of channels made available during a profile based viewing session initiated by the user.

According to an embodiment of the invention, the instructions described herein are further operable to cause one or more processors to perform the operations comprising: (a) receiving a channel change command; (b) identifying a next channel adjacent to a current channel within the profile channel list; and (c) outputting content associated with the next channel from the multimedia device to a display device.

According to an embodiment of the invention, the instructions described herein are further operable to cause one or more processors to perform the operations comprising: (a) receiving a program information request; (b) identifying each of the one or more channels within the profile channel list; (c) consolidating program information associated with each of the one or more identified channels into a program information user interface; and (d) outputting the program information user interface from the multimedia device to a display device.

According to an embodiment of the invention, the instructions described herein are further operable to cause one or more processors to perform the operations comprising: (a) identifying a time at which the user views each of the one or more identified channels; (b) generating a channel-time association for each identified time at which a channel was viewed by the user, wherein the channel-time association comprises a count equivalent to the number of times that the corresponding channel was viewed by the user at the corresponding time; and (c) saving the one or more channel-time associations within the profile channel list.

According to an embodiment of the invention, the instructions described herein are further operable to cause one or more processors to perform the operations comprising: (a)

determining that a current time is equivalent to a time of a channel-time association saved within the profile channel list; (b) identifying the channel of the channel-time association; and (c) outputting content associated with the identified channel from the multimedia device to a display device.

According to an embodiment of the invention, the instructions described herein are further operable to cause one or more processors to perform the operations comprising: (a) determining that a current time is equivalent to a time of a channel-time association saved within the profile channel list; (b) identifying the channel of the channel-time association; and (c) outputting a prompt from the multimedia device to a display device, wherein the prompt requests an input of a user decision whether to output content associated with the identified channel from the multimedia device to the display device.

According to an embodiment of the invention, the instructions described herein are further operable to cause one or more processors to perform the operations comprising: (a) receiving a power-on command at the multimedia device; (b) identifying a channel associated with the current time based upon the one or more channel-time associations; and (c) outputting content associated with the identified channel from the multimedia device to a display device.

FIG. 1 is a block diagram illustrating an example network environment 100 operable to facilitate the generation and utilization of a profile based channel lineup. In embodiments, one or more multimedia devices 105 (e.g., set-top box (STB), multimedia gateway device, DLNA multimedia device, etc.) may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of types of client devices 110, including but not limited to a television, computer, tablet, mobile device, STB, and others. It should be understood that a multimedia device 105 may communicate directly with, and receive one or more services directly from a subscriber network 120 or WAN 115. A client device 110 may receive the requested services through a connection to a multimedia device 105, through a direct connection to a subscriber network 120 (e.g., mobile network), through a direct connection to a WAN 115, or through a connection to a local network 125 that is provided by a multimedia device 105 or other access point within an associated premise. While the components shown in FIG. 1 are shown separate from each other, it should be understood that the various components can be integrated into each other.

In embodiments, a multimedia device 105 may be configured to initiate a default profile generation when the multimedia device 105 is booted up, or otherwise when a user requests generation of a default profile (e.g., via a connected or associated control device such as a remote control unit (RCU) or a client device 110). When generation of a default profile is initiated, the multimedia device 105 may monitor and record channel or tuning requests at the multimedia device 105 for a predetermined duration of time (e.g., five (5) to seven (7) days). At the end of the predetermined duration of time, the multimedia device 105 may aggregate information associated with the monitored channel or tuning requests to compile a profile channel list. The profile channel list may include identifiers of channels that were frequently tuned to or otherwise output by the multimedia device 105 during the predetermined duration of time.

In embodiments, after the default profile and channel list is initially created, the profile and channel list may be updated when new channels are tuned to by an associated user. The multimedia device 105 may be configured with a threshold to prevent transient channel changes from impacting the channel list. For example, the multimedia device 105 may monitor the frequency at which certain channels are requested by a user and may add to the channel list only those channels that are determined to have a request frequency higher than a threshold. The multimedia device 105 may remove channels from a channel list when the channel has not been requested by a user for a certain duration of time after being added to the channel list.

In embodiments, the multimedia device 105 may associate a default profile and profile channel list with all users of the multimedia device 105, an individual user, or a subset of users. The multimedia device 105 may associate the default profile and profile channel list with a user that requested the channel changes consolidated into the profile channel list, or a user may be prompted by the multimedia device 105 to name the default profile and profile channel list to indicate a specific user (e.g., "Mom," "Dad," "Child," etc.) to be associated with the profile and channel list. The multimedia device 105 may be configured to require entry of a password to access an individual user's profile and/or channel list for modification or utilization. Parental control settings may be used to prevent certain channels from being added to a channel list associated with a certain user.

In embodiments, the multimedia device 105 may be configured to automatically, or in response to a user request, enable profile based viewing. While profile based viewing is enabled, the multimedia device 105 may respond to channel change requests (e.g., "channel up," "channel down," etc.) by tuning or otherwise outputting only those channels that are included within a profile channel list of a default profile. While profile based viewing is enabled, the multimedia device 105 may respond to a program information request (e.g., guide request) by compiling program information associated with only those channels included within a profile channel list of a default profile, and the compiled program information may be output to a display device as a guide showing only those channels within the profile channel list. It should be understood that a user may disable profile based viewing to view channels that are not included in a profile channel list.

It should be understood that multiple profiles and channel lists may be stored at the multimedia device 105, and each profile and/or channel list may be associated with a specific user or plurality of users. A viewer may select which user profile or channel list is to be used while a session utilizing profile based viewing is ongoing, and the multimedia device 105 may provide a profile based viewing session using the profile and/or channel list associated with the selected user to respond to channel change and program information requests.

In embodiments, the multimedia device 105 may be configured to generate a temporal based channel profile. The multimedia device 105 may maintain a list of channels viewed by a specific user or by a specific device along with the time (e.g., time of day, day of week, etc.) at which the channel was viewed. While a temporal based channel viewing feature is enabled at the multimedia device 105, the multimedia device 105 may autonomously switch or may prompt the user to switch to a certain channel based on a current time matching up with a time at which the certain channel is frequently viewed by the user. For example, if a certain channel is viewed frequently at a certain day/time by a particular user, the multimedia device 105 may autonomously, or upon a user response from an output prompt, bookmark an association between the channel and the certain day/time.

In embodiments, a user may select a start-up channel for a user profile, wherein the start-up channel is based on the one or more channel-time associations observed during viewing sessions of the user. For example, when a "FAMILY" profile is switched on at 9:00 am, the multimedia device 105 may switch to CNBC News based on a channel-time association for the FAMILY profile (i.e., CNBC News has been associated with the FAMILY profile and the time slot of 9:00 am). If "CHILD-1" profile is switched on at 9:00 am, then the multimedia device 105 may switch to Cartoon Network based on "CHILD-1" profile bookmarks associating Cartoon Network with CHILD-1 and the time 9:00 am. If "DAD" profile is switched on at 9:00 am, then the multimedia device 105 may switch to the HISTORY channel based on "DAD" profile book-marks associating the HISTORY channel with the 9:00 am time slot and "DAD."

Figure 2:
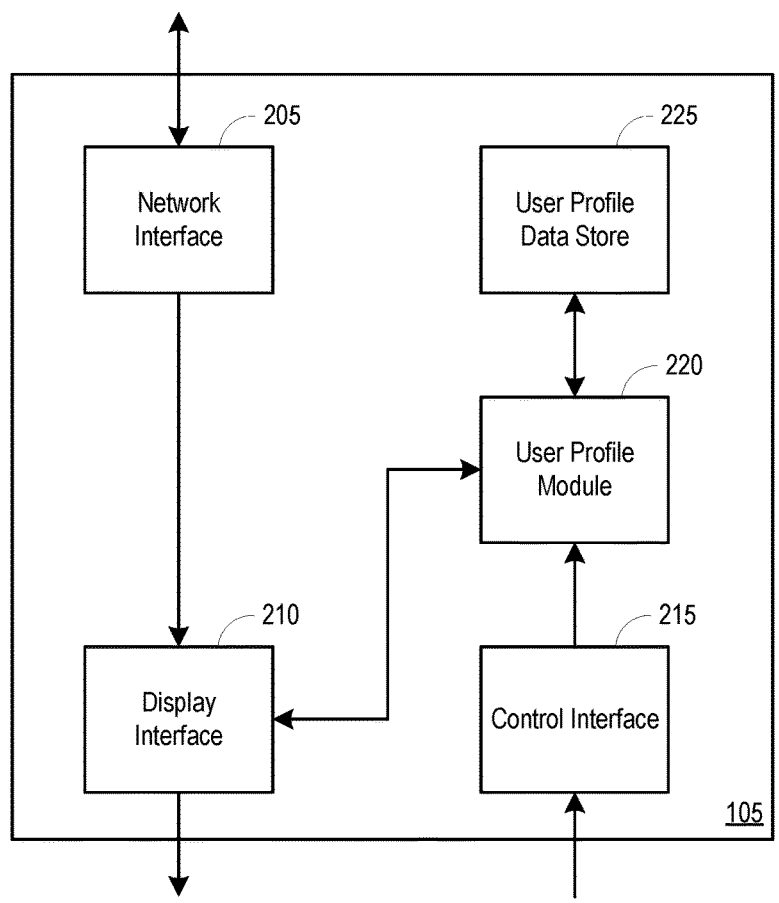
FIG. 2 is a block diagram illustrating an example multimedia device operable to facilitate the generation and utilization of a profile based channel lineup.

FIG. 2 is a block diagram illustrating an example multimedia device 105 operable to facilitate the generation and utilization of a profile based channel lineup. The multimedia device 105 may include a network interface 205, a display interface 210, a control interface 215, a user profile module 220, and a user profile data store 225. It should be understood that the multimedia device 105 may include a STB configured to provide video services to one or more display devices or client devices 110 of FIG. 1.

In embodiments, the network interface 205 may include one or more tuners, wherein each of the one or more tuners may be tuned to a channel to receive content carried over the channel. For example, each tuner 205 may be tuned to a frequency that is associated with a certain channel, and the frequency to which each tuner 205 is tuned may be controlled by requests received from user input to the multimedia device 105 or requests received from one or more client devices 110 of FIG. 1 through the control interface 215. It should be understood that each of the one or more tuners 205 can be tuned to a different channel. In embodiments, a user request can cause the network interface 205 to reserve a tuner for a period of time during which the tuner is to be tuned to a channel specified in the user request (e.g., where a user schedules a program to be recorded at the multimedia device 105 or an associated client device 110). Content received at the multimedia device 105 may be output to one or more displays or one or more client devices 110 through the display interface 210. It should be understood that the network interface 205 may include any interface configured to receive one or more services (e.g., data, video content, etc.) delivered to the multimedia device 105 as a signal or communication.

In embodiments, a content request (e.g., a request for live or stored content received from a designated channel or received in an IP packet stream) can be received through the control interface 215 as a key code or a uniform resource identifier (URI) request that is delivered from a client device 110 or a remote control unit (RCU) via an infrared (IR), radio frequency (RF), or other type of signal. The content request may identify a channel over which content is to be retrieved and output by the multimedia device 105.

In embodiments, the user profile module 220 may be configured to initiate a default profile generation when the multimedia device 105 is booted up, or otherwise when a user requests generation of a default profile (e.g., via a connected or associated control device such as a remote control unit (RCU) or a client device 110). When generation of a default profile is initiated, the user profile module 220 may monitor and record channel or tuning requests at the multimedia device 105 for a predetermined duration of time (e.g., five (5) to seven (7) days). At the end of the predetermined duration of time, the user profile module 220 may aggregate information associated with the monitored channel or tuning requests to compile a profile channel list. The profile channel list may include identifiers of channels that were frequently tuned to or otherwise output by the multimedia device 105 (e.g., channels tuned to by the network interface 205 and/or channels output through the display interface 210) during the predetermined duration of time. The profile channel list may be stored at the user profile data store 225.

In embodiments, after the default profile and channel list is initially created, the profile and channel list may be updated when new channels are tuned to by an associated user. The user profile module 220 may be configured with a threshold to prevent transient channel changes from impacting the channel list. For example, the user profile module 220 may monitor the frequency at which certain channels are requested by a user and may add to the channel list only those channels that are determined to have a request frequency higher than a threshold. The user profile module 220 may remove channels from a channel list when the channel has not been requested by a user for a certain duration of time after being added to the channel list.

In embodiments, the user profile module 220 may associate a default profile and profile channel list with all users of the multimedia device 105, an individual user, or a subset of users. The user profile module 220 may associate the default profile and profile channel list with a user that requested the channel changes consolidated into the profile channel list, or a user may be prompted by the multimedia device 105 to name the default profile and profile channel list to indicate a specific user (e.g., "Mom," "Dad," "Child," etc.) to be associated with the profile and channel list. The user profile module 220 may be configured to require entry of a password to access an individual user's profile and/or channel list for modification or utilization. Parental control settings may be used to prevent certain channels from being added to a channel list associated with a certain user.

In embodiments, the user profile module 220 may be configured to automatically, or in response to a user request, enable profile based viewing. While profile based viewing is enabled, the user profile module 220 may respond to channel change requests (e.g., "channel up," "channel down," etc.) by causing the network interface 205 to tune to, or otherwise causing the display interface 210 to output, only those channels that are included within a profile channel list of a default profile. While profile based viewing is enabled, the user profile module 220 may respond to a program information request (e.g., guide request) by compiling program information associated with only those channels included within a profile channel list of a default profile, and the compiled program information may be output to a display device as a guide showing only those channels within the profile channel list. It should be understood that a user may disable profile based viewing to view channels that are not included in a profile channel list.

It should be understood that multiple profiles and channel lists may be stored at the user profile data store 225, and each profile and/or channel list may be associated with a specific user or plurality of users. A viewer may select which user profile or channel list is to be used while a session utilizing profile based viewing is ongoing, and the user profile module 220 may provide a profile based viewing session using the profile and/or channel list associated with the selected user to respond to channel change and program information requests.

In embodiments, the user profile module 220 may be configured to generate a temporal based channel profile. The user profile module 220 may maintain, at the user profile data store 225, a list of channels viewed by a specific user or by a specific device along with the time (e.g., time of day, day of week, etc.) at which the channel was viewed. While a temporal based channel viewing feature is enabled at the multimedia device 105, the user profile module 220 may autonomously switch or may prompt the user to switch to a certain channel based on a current time matching up with a time at which the certain channel is frequently viewed by the user. For example, if a certain channel is viewed frequently at a certain day/time by a particular user, the user profile module 220 may autonomously, or upon a user response from an output prompt, bookmark an association between the channel and the certain day/time. While a temporal based channel viewing feature is enabled at the multimedia device 105, the user profile module 220 may determine a start-up channel based on the selected user profile and the current time. For example, the user profile module 220 may access a temporal channel list associated with the selected user profile, and the user profile module 220 may identify a channel associated with the selected user profile and the current time. The user profile module 220 may cause content of the identified channel to be output to the viewer through the display interface 210.

Figure 3:
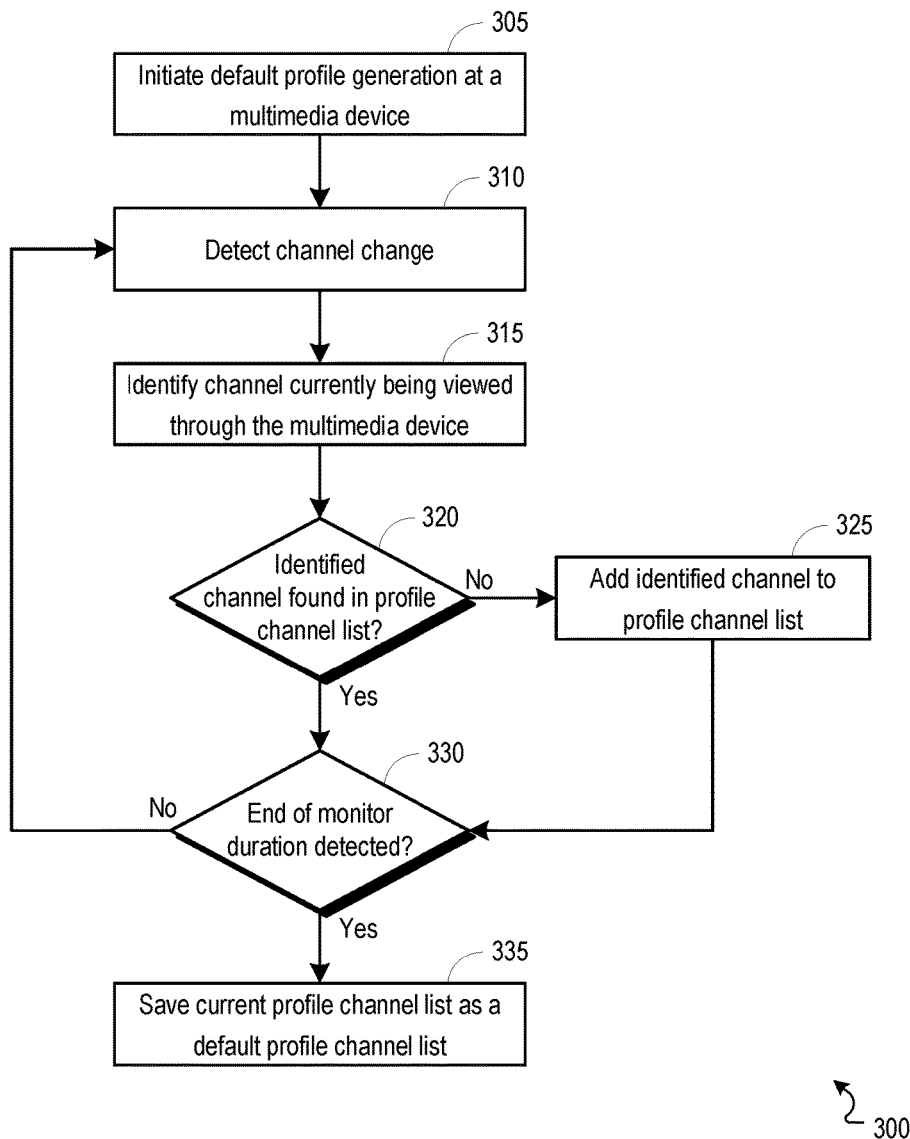
FIG. 3 is a flowchart illustrating an example process operable to facilitate the generation of a profile based channel lineup.

FIG. 3 is a flowchart illustrating an example process 300 operable to facilitate the generation of a profile based channel lineup. The process 300 may be carried out, for example, by a multimedia device 105 of FIG. 1 or any other device configured to deliver multimedia to one or more client devices 110 of FIG. 1. The process 300 can begin at 305, when a default profile generation at a multimedia device is initiated. In embodiments, the user profile module 220 of FIG. 2 may recognize a trigger for initiating a default profile generation. The multimedia device 105 may be configured such that the trigger includes a boot up of the multimedia device 105 or a specific request for the default profile generation being received from a user. The default profile generation may be carried out to create a default profile for a specific individual or for all or a subset of users of the multimedia device 105. For example, if the default profile is being generated for a specific user, channel viewing by the specific user may be monitored and stored as a separate profile from the profile of other users of the multimedia device 105.

At 310, a channel change may be detected. A channel change may be detected, for example, by the user profile module 220 of FIG. 2. In embodiments, a channel change may be detected when a channel change request (e.g., direct channel number entry, channel toggle, channel selection from guide or menu, channel jump request, or any other channel selection function provided by a control unit) is received at the multimedia device 105.

At 315, the channel currently being viewed through the multimedia device may be identified. The channel currently being viewed may be identified, for example, by the user profile module 220 of FIG. 2. In embodiments, the user profile module 220 may identify a channel number associated with a signal being received and processed by the multimedia device 105. For example, the user profile module 220 may identify a channel number associated with a signal to which a tuner of the multimedia device 105 is tuned.

At 320, a determination may be made whether the identified channel is included in a profile channel list. For example, the user profile module 220 of FIG. 2 may search a profile channel list stored at the user profile data store 225 of FIG. 2 for the identified channel. In embodiments, one or more profile channel lists may be stored at the user profile data store 225, and each respective one of the one or more profile channel lists may be associated with a specific user or device profile. For example, a profile channel list may be associated with a device profile (e.g., profile for all users of a multimedia device 105 of FIG. 1) or a profile channel list may be associated with a specific user of a device. The user profile module 220 may search for the identified channel within the contents of the profile channel list that is associated with the specific user or device profile for which the default profile (e.g., default profile identified at 305) is being generated.

If, at 320, the determination is made that identified channel is not included in the profile channel list, the process 300 may proceed to 325. At 325, the identified channel may be added to the profile channel list. For example, the user profile module 220 of FIG. 2 may add an identifier and/or program information of the identified channel to the profile channel list stored at the user profile data store 225 of FIG. 2. It should be understood that the user profile module 220 may be configured with other requirements for adding an identified channel to the profile channel list. For example, the user profile module 220 may require that the identified channel be tuned to for at least a predetermined duration of time or at least a predetermined number of times before adding the identified channel to the profile channel list. The process 300 may then proceed to 330.

Returning to 320, if the determination is made that the identified channel is included in the profile channel list, the process 300 may proceed to 330. At 330, the determination may be made whether the end of a monitor duration has been detected. The determination whether the end of a monitor duration has occurred may be made, for example, by the user profile module 220 of FIG. 2. In embodiments, a multimedia device 105 of FIG. 1 may be configured with a predetermined default duration (e.g., a certain number of days such as five (5) to seven (7) days), during which channel tuning of the multimedia device 105 is monitored to create a default profile. The end of the default (i.e., monitor) duration may be identified when generation of the default profile is initiated at 305. For example, the user profile module 220 may establish a time to end the monitoring of channel tuning taking place at the multimedia device 105, and the end time may be determined based upon the time at which generation of the default profile was initiated and the predetermined default duration.

If, at 330, the determination is made that the end of the monitor duration has not been detected, the multimedia device 105 may continue to monitor channel tuning until another channel change is detected at 310.

If, at 330, the determination is made that the end of the monitor duration has been detected, the process 300 may proceed to 335. At 335, the current profile channel list may be saved as a default profile channel list. For example, the user profile module 220 of FIG. 2 may save the profile channel list (e.g., the profile channel list that has been created by adding the one or more identified channels (i.e., channel(s) identified at 315)) as a default profile channel list within the user profile data store 225 of FIG. 2. The default profile channel list may be associated with the multimedia device 105 of FIG. 1, another device (e.g., client device 110 of FIG. 1), or a specific user or subset of users, and the default profile channel list may be accessed by the multimedia device 105 to support profile based channel tuning and guide services.

Figure 4:
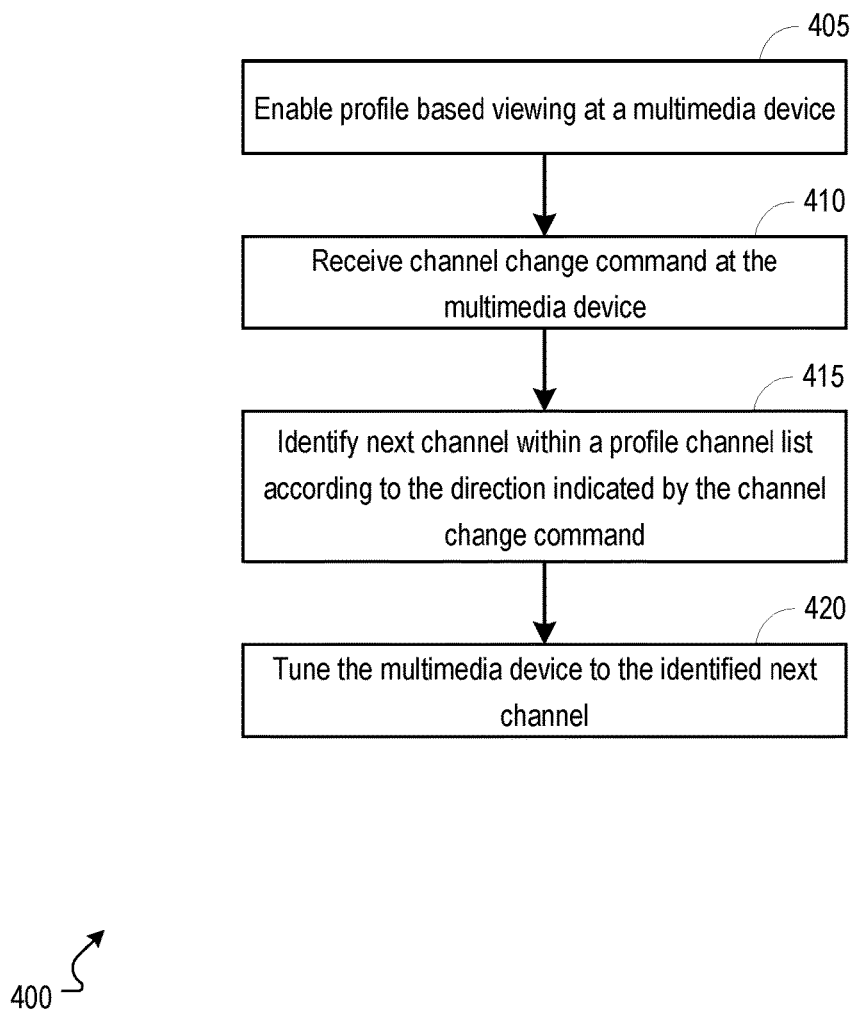
FIG. 4 is a flowchart illustrating an example process operable to facilitate channel tuning based on one or more channels included within a profile channel list.

FIG. 4 is a flowchart illustrating an example process 400 operable to facilitate channel tuning based on one or more channels included within a profile channel list. The process 400 may be carried out, for example, by a multimedia device 105 of FIG. 1 or any other device configured to deliver multimedia to one or more client devices 110 of FIG. 1. The process 400 can begin at 405, when profile based viewing is enabled at a multimedia device (e.g., multimedia device 105). In embodiments, a multimedia device 105 may be configured to enable profile based viewing when the multimedia device 105 is booted up, when profile based viewing is requested by a user (e.g., via a command received at the multimedia device 105 from a control interface such as an RCU), when a specific user profile is selected by a user, or upon the occurrence of various other conditions or the reception of various other user commands. For example, a profile based viewing trigger may be recognized by a user profile module 220 of FIG. 2, and the user profile module 220 may enable profile based viewing at the multimedia device 105.

At 410, a channel change command may be received at the multimedia device 105. The channel change command may be received at the multimedia device 105 as a user request (e.g., from a control interface such as an RCU), and the channel change command may be recognized, for example, by the user profile module 220 of FIG. 2. The channel change command may arrive at the multimedia device 105 in various forms including, but not limited to a channel toggle command (e.g., command transmitted from a control interface in response to the depressing of a "channel up," "channel down," or "scan" button). For example, the channel toggle command may indicate a direction in which to navigate a channel list.

At 415, a next channel within a profile channel list may be identified. The next channel may be identified according to the direction indicated by the channel change command. The next channel may be identified, for example, by the user profile module 220 of FIG. 2. In embodiments, the user profile module 220 may identify a profile channel list (e.g., profile channel list stored at the user profile data store 225 of FIG. 2) associated with the enabled user profile. The user profile module 220 may then identify a next channel within the profile channel list, wherein the next channel is a channel adjacent (in the direction indicated by the channel change command) to the current channel being viewed through the multimedia device 105.

At 420, the multimedia device 105 may retrieve content associated with the identified next channel. In embodiments, the multimedia device 105 may be tuned to the identified next channel or may otherwise retrieve content from a signal associated with the identified next channel. The multimedia device 105 may process and output content associated with the identified next channel to a display device or client device (e.g., client device 110 of FIG. 1).

Figure 5:
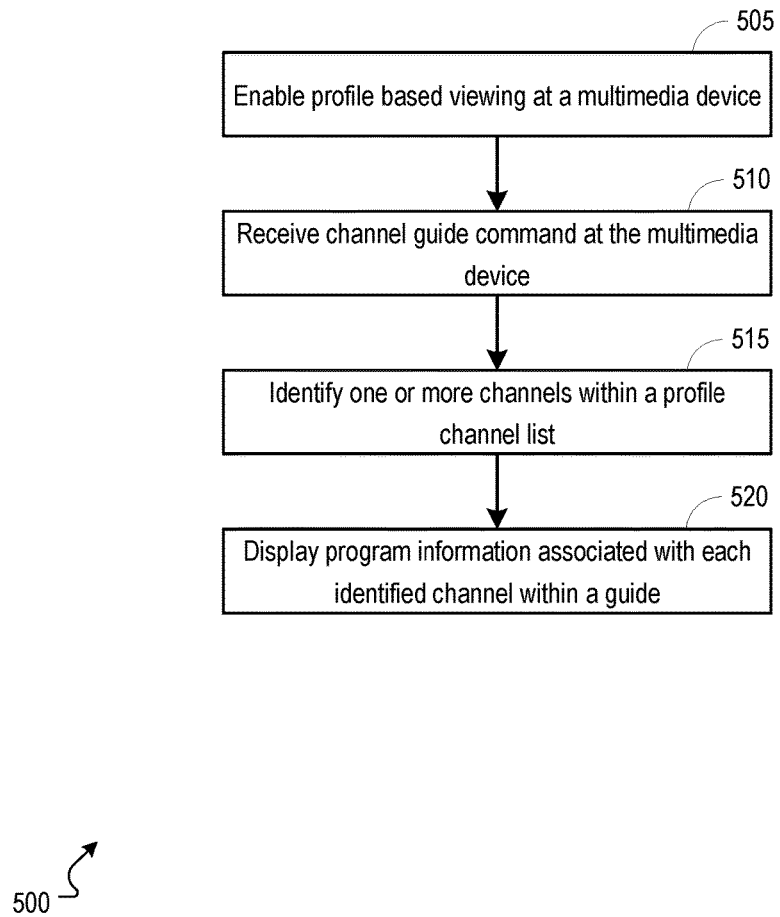
FIG. 5 is a flowchart illustrating an example process operable to facilitate the output of program information based on one or more channels included within a profile channel list.

FIG. 5 is a flowchart illustrating an example process 500 operable to facilitate the output of program information based on one or more channels included within a profile channel list. The process 500 may be carried out, for example, by a multimedia device 105 of FIG. 1 or any other device configured to deliver multimedia to one or more client devices 110 of FIG. 1. The process 500 can begin at 505, when profile based viewing is enabled at a multimedia device (e.g., multimedia device 105). In embodiments, a multimedia device 105 may be configured to enable profile based viewing when the multimedia device 105 is booted up, when profile based viewing is requested by a user (e.g., via a command received at the multimedia device 105 from a control interface such as an RCU), when a specific user profile is selected by a user, or upon the occurrence of various other conditions or the reception of various other user commands. For example, a profile based viewing trigger may be recognized by a user profile module 220 of FIG. 2, and the user profile module 220 may enable profile based viewing at the multimedia device 105.

At 510, a channel guide command may be received at the multimedia device 105. The channel guide command may be received at the multimedia device 105 as a user request (e.g., from a control interface such as an RCU), and the channel guide command may be recognized, for example, by the user profile module 220 of FIG. 2. The channel guide command may include any request for a consolidated display of program information associated within one or more channels.

At 515, one or more channels within a profile channel list may be identified. The one or more channels may be identified, for example, by the user profile module 220 of FIG. 2. In embodiments, the user profile module 220 may identify a profile channel list (e.g., profile channel list stored at the user profile data store 225 of FIG. 2) associated with the enabled user profile. The user profile module 220 may then identify each of one or more channels included within the profile channel list. The user profile module 220 may identify program information associated with each of the one or more channels included within the profile channel list. For example, the user profile module 220 may identify program information from electronic program guide (EPG) data received at the multimedia device 105.

At 520, program information associated with each of the one or more identified channels may be consolidated and displayed within a user interface. The program information may be consolidated into a user interface (e.g., a guide), for example, by the user profile module 220. In embodiments, the user interface generated by the user profile module 220 may include an interactive table including identifiers of each of the one or more identified channels. The user interface may include other program information (e.g., channel, program title, program summary, duration of program, start time of program, etc.) associated with each of the identified one or more channels. The user interface (e.g., guide) may be output from the multimedia device 105 to a display device or other client device (e.g., client device 110 of FIG. 1).

Figure 6:
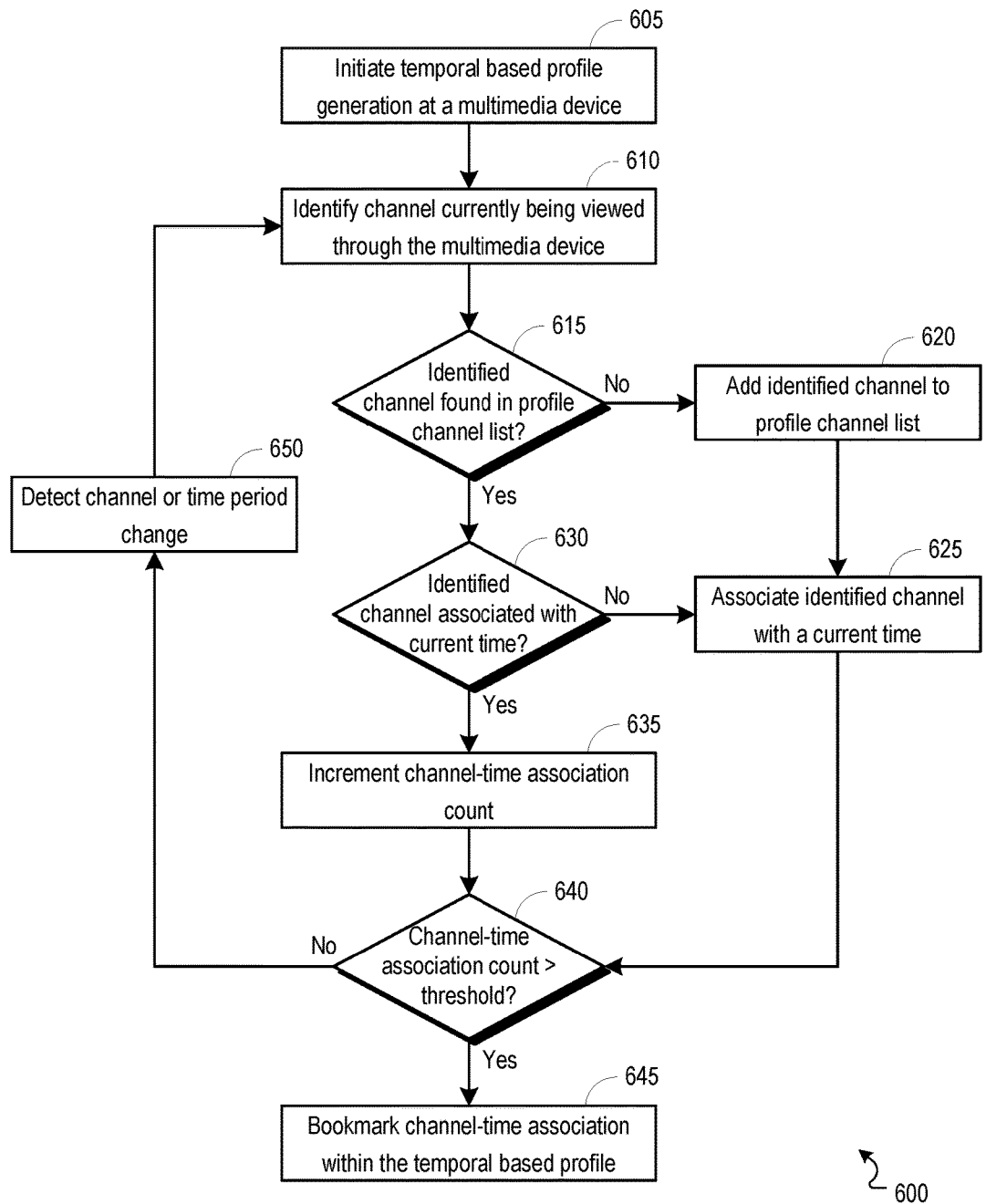
FIG. 6 is a flowchart illustrating an example process operable to facilitate the generation of a temporal based profile and channel lineup.

FIG. 6 is a flowchart illustrating an example process 600 operable to facilitate the generation of a temporal based profile and channel lineup. The process 600 may be carried out, for example, by a multimedia device 105 of FIG. 1 or any other device configured to deliver multimedia to one or more client devices 110 of FIG. 1. The process 600 can begin at 605, when a temporal based profile generation at a multimedia device 105 is initiated. In embodiments, the user profile module 220 of FIG. 2 may recognize a trigger for initiating a temporal based profile generation. The multimedia device 105 may be configured such that the trigger includes a boot up of the multimedia device 105 or a specific request for the temporal based profile generation being received from a user. The temporal based profile generation may be carried out to create a temporal based profile for a specific individual or for all or a subset of users of the multimedia device 105. For example, if the temporal based profile is being generated for a specific user, channel viewing by the specific user may be monitored and stored as a separate profile from the profile of other users of the multimedia device 105.

At 610, the channel currently being viewed through the multimedia device may be identified. The channel currently being viewed may be identified, for example, by the user profile module 220 of FIG. 2. In embodiments, the user profile module 220 may identify a channel number associated with a signal being received and processed by the multimedia device 105. For example, the user profile module 220 may identify a channel number associated with a signal to which a tuner of the multimedia device 105 is tuned.

At 615, a determination may be made whether the identified channel is included in a profile channel list. For example, the user profile module 220 of FIG. 2 may search a profile channel list stored at the user profile data store 225 of FIG. 2 for the identified channel. In embodiments, one or more profile channel lists may be stored at the user profile data store 225, and each respective one of the one or more profile channel lists may be associated with a specific user or device profile. For example, a profile channel list may be associated with a device profile (e.g., profile for all users of a multimedia device 105 of FIG. 1) or a profile channel list may be associated with a specific user of a device. The user profile module 220 may search for the identified channel within the contents of the profile channel list that is associated with the specific user or device profile for which the default profile (e.g., default profile identified at 605) is being generated.

If, at 615, the determination is made that identified channel is not included in the profile channel list, the process 600 may proceed to 620. At 620, the identified channel may be added to the profile channel list. For example, the user profile module 220 of FIG. 2 may add an identifier and/or program information of the identified channel to the profile channel list stored at the user profile data store 225 of FIG. 2.

At 625, the identified channel may be associated with a current time. The identified channel may be associated with a current time, for example, by the user profile module 220 of FIG. 2. In embodiments, the user profile module 220 may determine a current time or current time period and may store an association between the identified channel and the current time or time period within the profile channel list stored at the user profile data store 225 of FIG. 2. It will be appreciated by those skilled in the relevant art that the current time or time period may be determined using various sources and/or techniques. For example, a current time or time period may be captured from EPG data received at the multimedia device 105, from an internal clock at the multimedia device 105, or from another source.

Returning to 615, if the determination is made that the identified channel is included in the profile channel list, the process 600 may proceed to 630. At 630, a determination may be made whether the identified channel has previously been associated with the current time within the profile channel list. For example, the user profile module 220 of FIG. 2 may search the profile channel list stored at the user profile data store 225 of FIG. 2 for an association between the identified channel and the current time. In embodiments, a profile channel list may include an association between each channel identified (i.e., each channel output for viewing/recording by the multimedia device 105 of FIG. 1 during a generation and/or update of the channel list) and a time or time period at which the identified channel was processed for viewing/recording by a user. The profile channel list may include a count for each channel-time association. For example, the count for a channel-time association may indicate the number of times or the frequency at which the channel has been processed for output by the multimedia device 105 at the associated time or during the associated time period.

If, at 630, the determination is made that the identified channel has not previously been associated with the current time within the profile channel list, the process 600 may proceed to 625 where an association between the identified channel and the current time may be stored (e.g., at the user profile data store 225 of FIG. 2).

If, at 630, the determination is made that the identified channel has previously been associated with the current time within the profile channel list, the process 600 may proceed to 635. At 635, the channel-time association count for the identified channel and the current time may be incremented. For example, the user profile module 220 of FIG. 2 may increment the channel-time association that is stored at the user profile data store 225 of FIG. 2.

At 640, a determination may be made whether the channel-time association count is greater than a predetermined threshold. The determination whether the channel-time association count is greater than a predetermined threshold may be made, for example, by the user profile module 220 of FIG. 2. It should be understood that the user profile module 220 may be configured with any predetermined threshold that may be used to provide an indication that a user frequently requests the identified channel at the associated time or during the associated time period.

If, at 640, the determination is made that the channel-time association count is greater than the predetermined threshold, the process 600 may proceed to 645. At 645, the channel-time association may be bookmarked within a temporal based profile. For example, the user profile module 220 of FIG. 2 may bookmark the channel-time association with the temporal based profile stored at the user profile data store 225 of FIG. 2. In embodiments, the bookmarked or tagged channel-time association may be used by the multimedia device 105 of FIG. 1 to either autonomously process and output the channel or notify the user of the channel-time association at the associated time.

If, at 640, the determination is made that the channel-time association count is not greater than the predetermined threshold, the process 600 may proceed to 650. At 650, the multimedia device 105 of FIG. 1 may continue to monitor channel tuning until a channel change or time period change is detected. In embodiments, the user profile module 220 of FIG. 2 may detect a channel change at the multimedia device 105 (e.g., via a command received through a control interface 215 of FIG. 2 or tuner change at a network interface 205 of FIG. 2) or a crossing of a time boundary (e.g., via retrieved EPG data). For example, a crossing of a time boundary may signify the beginning of a new program, thus requiring a creating of a new channel-time association or an incrementing of an existing channel-time association.

Figure 7:
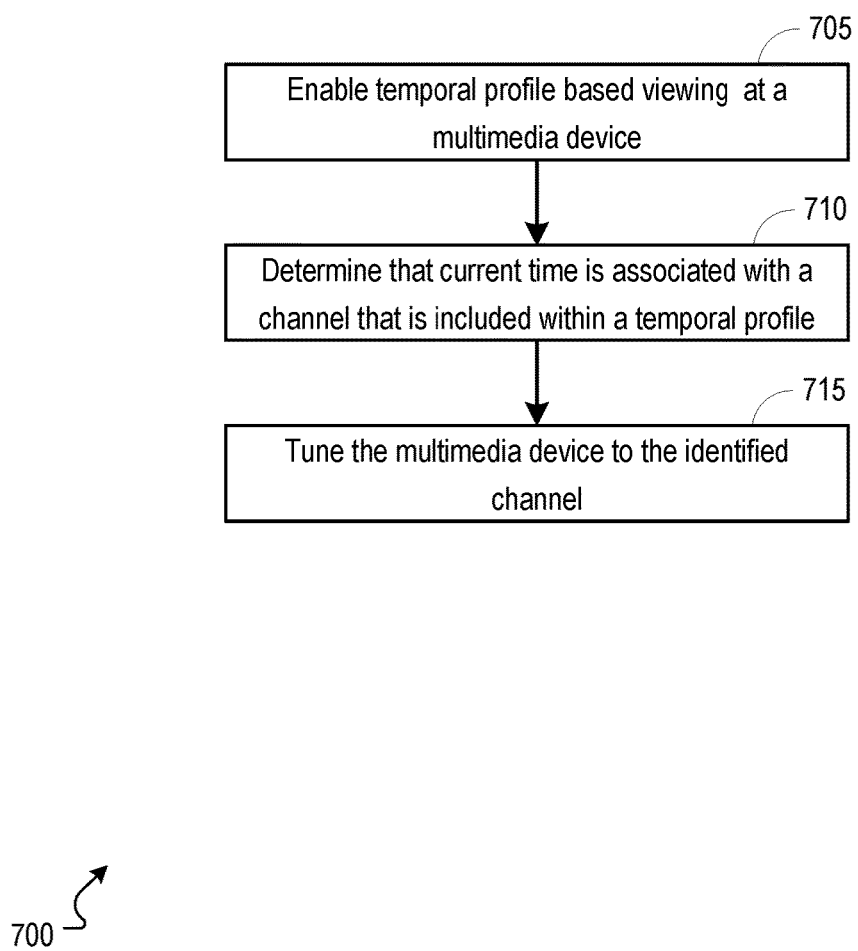
FIG. 7 is a flowchart illustrating an example process operable to facilitate channel tuning based on a channel-time association.

FIG. 7 is a flowchart illustrating an example process 700 operable to facilitate channel tuning based on a channel-time association. The process 700 may be carried out, for example, by a multimedia device 105 of FIG. 1 or any other device configured to deliver multimedia to one or more client devices 110 of FIG. 1. The process 700 can begin at 705, when temporal profile based viewing is enabled at a multimedia device (e.g., multimedia device 105). In embodiments, a multimedia device 105 may be configured to enable temporal profile based viewing when the multimedia device 105 is booted up, when temporal profile based viewing is requested by a user (e.g., via a command received at the multimedia device 105 from a control interface such as an RCU), when a specific user profile is selected by a user, or upon the occurrence of various other conditions or the reception of various other user commands. For example, a temporal profile based viewing trigger may be recognized by a user profile module 220 of FIG. 2, and the user profile module 220 may enable temporal profile based viewing at the multimedia device 105. Temporal profile based viewing may allow the multimedia device 105 to autonomously tune to or suggest a channel that is frequently viewed by a user at a current time or during a current time duration.

At 710, the determination may be made that a current time is associated with a channel that is included within a temporal profile. The association between a current time and a specific channel may be detected, for example, by the user profile module 220 of FIG. 2. In embodiments, a temporal profile may be stored at the multimedia device 105 of FIG. 1 (e.g., at the user profile data store 225 of FIG. 2), and the temporal profile may include one or more bookmarked channel-time associations. When the user profile module 220 detects that a current time matches a time of a channel-time association stored at the user profile data store 225, the user profile module 220 may identify the specific channel associated with the current time.

At 715, the multimedia device 105 may retrieve content associated with the identified channel. In embodiments, the multimedia device 105 may be tuned to the identified channel or may otherwise retrieve content from a signal associated with the identified channel. The multimedia device 105 may process and output content associated with the identified channel to a display device or client device (e.g., client device 110 of FIG. 1). When the determination is made that the current time matches a time of a channel-time association, the multimedia device 105 may autonomously tune to and output the identified channel, or the multimedia device 105 may output a notification to a user (e.g., through a connected or associated display device) that the multimedia device 105 is frequently tuned to the identified channel at the current time, and the multimedia device 105 can subsequently tune to and output the identified channel in response to a user request for the identified channel.

Figure 8:
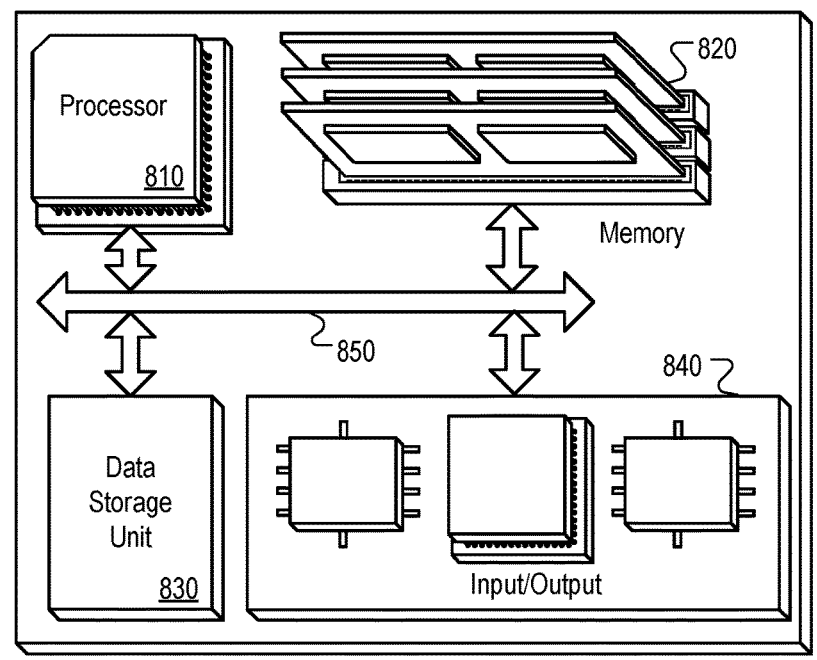
FIG. 8 is a block diagram of a hardware configuration operable to facilitate the generation and utilization of a profile based channel lineup.

FIG. 8 is a block diagram of a hardware configuration 800 operable to facilitate the generation and utilization of a profile based channel lineup. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, etc.). In embodiments, the input/output device can include driver devices configured to send communications to, and receive communications from one or more networks (e.g., subscriber network 120 of FIG. 1, WAN 115 of FIG. 1, local network 125 of FIG. 1, etc.).

Those skilled in the art will appreciate that the invention improves upon methods and systems for displaying available channels to a user and for creating and implementing profile based viewing features. Methods, systems, and computer readable media can be operable to facilitate the generation and utilization of a profile based channel lineup. A multimedia device delivering video services to one or more users may monitor channel and content requests received by the individual one or more users, and the multimedia device may create a profile for each of the users, wherein the profile includes a channel list of only those channels that are frequently tuned to by the respective user. The multimedia device may create an association between a user, a frequently viewed channel, and a time at which the channel is typically viewed by the user. A profile based viewing session or feature may be enabled at the multimedia device, wherein tuning decisions, channel change responses, and program information displays are controlled by the multimedia device based on a profile associated with a selected user.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   initiating a user profile generation at a multimedia device, wherein the multimedia device monitors channel viewing by a user associated with the user profile for a predetermined duration of time, wherein the user profile generation is initiated in response to a user request for generation of the user profile being received at the multimedia device, and wherein the request is received from an associated control device;
   before an expiration of the predetermined duration of time:
   identifying each of one or more channels viewed by the user through the multimedia device;
   adding each of the one or more identified channels to a profile channel list associated with the user profile; and
   maintaining a count of the number of times each of the one or more identified channels is viewed;
   when the predetermined duration of time expires:
   for each respective one channel within the profile channel list that is viewed more than a minimum number of times during the predetermined duration of time, assigning the respective one channel a priority value based upon the number of times the respective one channel was viewed by the user during the predetermined duration of time;
   ordering the channels within the profile channel list such that channels are listed within the profile channel list from the channel having the highest priority value to the channel having the lowest priority value;
   identifying a time at which the user views each of the one or more identified channels;
   generating a channel-time association for each identified time at which a channel was viewed by the user, wherein the channel-time association comprises a count equivalent to the number of times that the corresponding channel was viewed by the user at the corresponding time;
   saving the one or more channel-time associations within the profile channel list;
   determining that a current time is equivalent to a time of a channel-time association saved within the profile channel list;
   identifying the channel of the channel-time association; and
   in response to the determination that the current time is equivalent to the time of the channel-time association, outputting a prompt from the multimedia device to a display device, wherein the prompt requests an input of a user decision whether to output content associated with the identified channel from the multimedia device to the display device.

2. The method of claim 1, further comprising:
   receiving a program information request;
   identifying each of the one or more channels within the profile channel list;
   consolidating program information associated with each of the one or more identified channels into a program information user interface; and
   outputting the program information user interface from the multimedia device to a display device.

3. The method of claim 1, further comprising:
determining that a current time is equivalent to a time of a channel-time association saved within the profile channel list;
identifying the channel of the channel-time association; and
outputting content associated with the identified channel from the multimedia device to a display device.

4. The method of claim 1, further comprising:
receiving a power-on command at the multimedia device;
identifying a channel associated with the current time based upon the one or more channel-time associations; and
outputting content associated with the identified channel from the multimedia device to a display device.

5. An apparatus comprising: a processor which executes modules, one of said modules comprising a user profile module that:
in response to a user request for generation of a user profile being received from an associated control device, monitors channel viewing by a user associated with the user profile for a predetermined duration of time;
before an expiration of the predetermined duration of time:
identifies each of one or more channels viewed by the user;
adds each of the one or more identified channels to a profile channel list associated with the user profile; and
maintains a count of the number of times each of the one or more identified channels is viewed;
when the predetermined duration of time expires:
for each respective one channel within the profile channel list that is viewed more than a minimum number of times during the predetermined duration of time, assigns the respective one channel a priority value based upon the number of times the respective one channel was viewed by the user during the predetermined duration of time;
orders the channels within the profile channel list such that channels are listed within the profile channel list from the channel having the highest priority value to the channel having the lowest priority value;
identifies a time at which the user views each of the one or more identified channels;
generates a channel-time association for each identified time at which a channel was viewed by the user, wherein the channel-time association comprises a count equivalent to the number of times that the corresponding channel was viewed by the user at the corresponding time;
saves the one or more channel-time associations within the profile channel list;
determines that a current time is equivalent to a time of a channel-time association saved within the profile channel list;
identifies the channel of the channel-time association; and
in response to the determination that the current time is equivalent to the time of the channel-time association, outputs a prompt from the multimedia device to a display device, wherein the prompt requests an input of a user decision whether to output content associated with the identified channel from the multimedia device to the display device.

6. The apparatus of claim 5, further comprising:
one or more interfaces that receive a program information request;
wherein the user profile module:
identifies each of the one or more channels within the profile channel list; and
consolidates program information associated with each of the one or more identified channels into a program information user interface; and
wherein the one or more interfaces output the program information user interface to a display device.

7. The apparatus of claim 5, further comprising:
wherein the user profile module:
determines that a current time is equivalent to a time of a channel-time association saved within the profile channel list; and
identifies the channel of the channel-time association; and
one or more interfaces that output content associated with the identified channel to a display device.

8. One or more non-transitory computer readable media having instructions operable to cause one or more processors to perform the operations comprising:
initiating a user profile generation at a multimedia device, wherein the multimedia device monitors channel viewing by a user associated with the user profile for a predetermined duration of time, wherein the user profile generation is initiated in response to a user request for generation of the user profile being received at the multimedia device, and wherein the request is received from an associated control device;
before an expiration of the predetermined duration of time:
identifying each of one or more channels viewed by the user through the multimedia device;
adding each of the one or more identified channels to a profile channel list associated with the user profile; and
maintaining a count of the number of times each of the one or more identified channels is viewed;
when the predetermined duration of time expires:
for each respective one channel within the profile channel list that is viewed more than a minimum number of times during the predetermined duration of time, assigning the respective one channel a priority value based upon the number of times the respective one channel was viewed by the user during the predetermined duration of time;
ordering the channels within the profile channel list such that channels are listed within the profile channel list from the channel having the highest priority value to the channel having the lowest priority value;
identifying a time at which the user views each of the one or more identified channels;
generating a channel-time association for each identified time at which a channel was viewed by the user, wherein the channel-time association comprises a count equivalent to the number of times that the corresponding channel was viewed by the user at the corresponding time;
saving the one or more channel-time associations within the profile channel list;
determining that a current time is equivalent to a time of a channel-time association saved within the profile channel list;
identifying the channel of the channel-time association; and
in response to the determination that the current time is equivalent to the time of the channel-time association, outputting a prompt from the multimedia device to a display device, wherein the prompt requests an input of a user decision whether to output content associated with the identified channel from the multimedia device to the display device.

9. The one or more non-transitory computer-readable media of claim 8, wherein the instructions are further operable to cause one or more processors to perform the operations comprising:
receiving a program information request;
identifying each of the one or more channels within the profile channel list;
consolidating program information associated with each of the one or more identified channels into a program information user interface; and
outputting the program information user interface from the multimedia device to a display device.

10. The one or more non-transitory computer-readable media of claim 8, wherein the instructions are further operable to cause one or more processors to perform the operations comprising:
determining that a current time is equivalent to a time of a channel-time association saved within the profile channel list;
identifying the channel of the channel-time association; and
outputting content associated with the identified channel from the multimedia device to a display device.

11. The one or more non-transitory computer-readable media of claim 8, wherein the instructions are further operable to cause one or more processors to perform the operations comprising:
receiving a power-on command at the multimedia device;
identifying a channel associated with the current time based upon the one or more channel-time associations; and
outputting content associated with the identified channel from the multimedia device to a display device.

* * * * *